No. 796,156. PATENTED AUG. 1, 1905.
S. H. SHELLEY.
FRUIT PACKING MACHINE.
APPLICATION FILED FEB. 6, 1905.

Witnesses:

Inventor,
Sivert N. Shelley
By Geo. H. Strong atty

UNITED STATES PATENT OFFICE.

SIVERT H. SHELLEY, OF SAN JOSE, CALIFORNIA.

FRUIT-PACKING MACHINE.

No. 796,156.      Specification of Letters Patent.      Patented Aug. 1, 1905.

Application filed February 6, 1905. Serial No. 244,456.

*To all whom it may concern:*

Be it known that I, SIVERT H. SHELLEY, a citizen of the United States, residing at San Jose, in the county of Santa Clara and State of California, have invented new and useful Improvements in Packing Prunes and other Cured Fruits, of which the following is a specification.

My invention relates to improvements in packing dried prunes and the like into boxes preparatory to shipment.

Under present methods it is customary to pack dried prunes into boxes of ten to twenty-five pounds in weight, employing girl operators to "face" the box or first lay in symmetrically by hand a layer of prunes of uniform size. Then the box is filled with loose prunes and placed in a press to compact the mass, after which the bottom of the box is nailed on.

The object of my invention is to do away with the expense and time of manually "facing" the box and by a simple method mechanically pack the prunes into the box in cubes or bricks of uniform weight and size similar to cartons without in any way injuring the fruit or detracting from the appearance of the box when opened.

The invention consists of the parts and the construction and combination of parts, as hereinafter more fully described, having reference to the accompanying drawings, in which—

Figure 1:
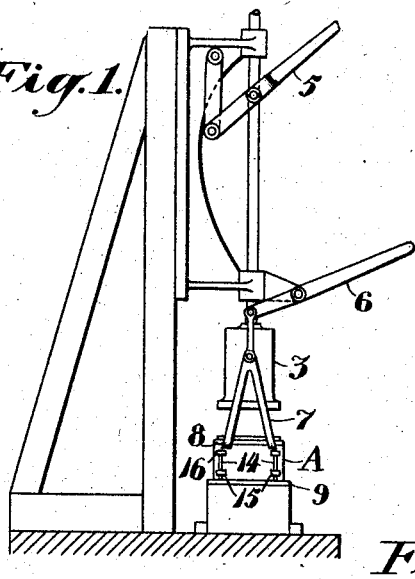
Figure 2:
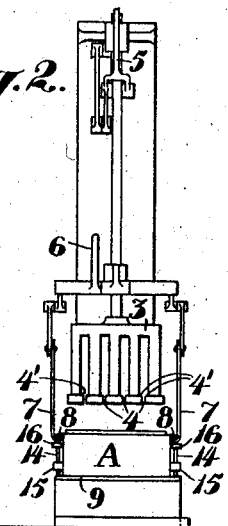
Figure 3:
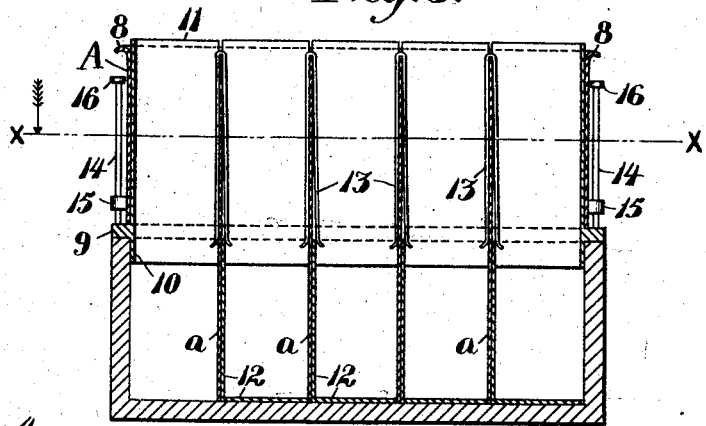
Figure 4:
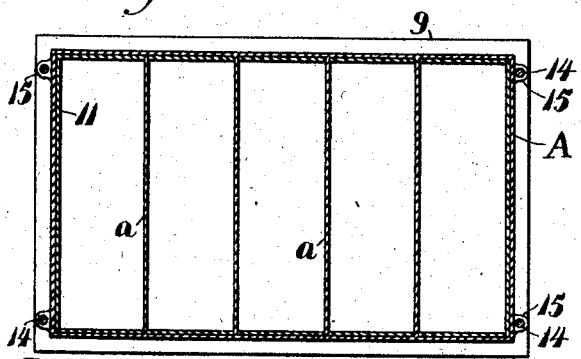
Figure 5:
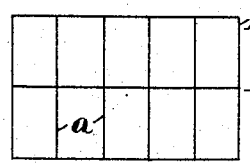
Figure 6:
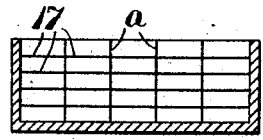

Figure 1 is a side view of my press. Fig. 2 is a front view of same. Fig. 3 is a longitudinal vertical section of the mold in position in a box. Fig. 4 is a section taken on line $xx$ of Fig. 3. Fig. 5 is a plan of a mold, showing the partition-plates extending longitudinally and transversely. Fig. 6 is a sectional view of a box, showing the horizontal wafers in position.

In carrying out my invention I employ a cellular frame or open-ended mold A, having a plurality of compartments of any suitable shape or size. This mold is preferably composed of a series of appropriately-spaced vertically-arranged plates secured at one end in an inclosing metal band or supporting-frame. The plates may extend longitudinally and transversely of the frame, as in Fig. 5, or only transversely, as in Fig. 4. This upper inclosed part of the mold is of approximately the same interior diameter as the box to be filled and is adapted to seat on the upper edges of the box and in continuation thereof, while the plates composing the divisions of the mold are prolonged, as shown at $a$, below the supporting-frame to extend within and to the bottom of the box. The depth of the inclosed part of the mold above the box is sufficient to form a suitable support to secure the plates to and to afford a sort of hopper extension above the box when the mold is inserted into the box ready for filling.

With the mold in the box the several compartments of the mold are filled, and by suitable pressure means the contents of the compartments are compressed into separate columns or bricks having a length or height just equal to the depth of the box. The mold being withdrawn, the bottom is nailed on and the box is ready for shipment.

Any appropriate means may be employed to compress the fruit. In the present case I have shown a press having a vertically-reciprocating follower 3, conforming in shape and size to the inside of the box and being vertically slotted, as at 4, correspondingly with the partition-plates of the mold.

The box with the mold in position and the compartments filled is placed under the follower, with the partition-plates of the mold registering with the slots in the follower, which latter may then be reciprocated by the lever or handle 5 to compress the contents of the box and mold. While the follower is still down the mold is retracted up into the follower free from the compressed contents by suitable means, as the lever 6 and the links 7, having hooks at their ends to engage the flanges 8 on the outside of the mold.

The above is my device in its simplest form and for some classes of work will do very satisfactorily. In working with dried prunes, however, for which the apparatus was particularly designed, there is danger of the fruit squeezing out through the crack between the under side of the combined supporting-frame and hopper portion of the mold and the top of the box when pressure is brought on the fruit in the mold to compact it into its final narrow limits. Therefore I prefer to use a simple little device which will bridge over this space between the mold and the box and which will be removed with the mold at the final operation of the plunger or follower. Between the hopper portion of the mold and the box I interpose a steel or other band or rim 9, having thin metal plates or lips projecting downward a short distance into the box, as shown at 10, and upward inside and possibly a little above the mold, as shown at 11. The latter are slitted to accommodate the partition-strips of the mold.

The mold, the band with its plates 10 11, and the box interengage and telescope, so that when all are assembled ready for filling they will be held firmly together.

Paper, muslin, wood veneer or any other suitable material may be inserted between the several bricks or cubes of fruit within the box. Preferably I lay in pieces of wood veneer or shavings, as 12, around certain of the sides of the compartments, which serve to preserve the integrity of the compressed contents of each compartment after the removal of the mold and to permit any one cube or brick to be removed and sold separately to the consumer without in any way disturbing the remaining contents of the box. The wood division-strips are preferable for the reason that they seem to be unaffected by the natural moisture of the fruit and have no deleterious effect on the fruit.

Where a veneer is inserted between the columns of fruit, I employ thin metal clips 13, which slip over the partition-plates of the mold and are long enough to reach down a little below the level of the top of the box to engage the upper edge of the veneer strips and cover the latter, so as not to interfere with the follower when it descends, it being understood, of course, that the veneers do not want to extend above the top of the fruit when the box is filled.

The follower is preferably constructed so that its body above its lower compression-face is narrowed, and the slots 4 are broadened in this portion to provide ledges 4' near their lower ends, upon which the slightly-outturned spring ends of the clips 13 will catch after the follower has descended its full distance and be retracted upward with and removed by the follower. By narrowing the body of the follower in the direction of the length of the clips it leaves the ends of the latter sticking out, so as easily to be grasped by the fingers and removed.

The band 9 and mold may be connected together in a suitable manner, so that while the mold may have a limited independent movement necessary in its partial withdrawal from the fruit both will be carried upward together free from the box at the completion of the compressing operation. Hence I have shown each corner of the band outside the mold provided with the standards or rods 14, running in guides 15 on the mold, the rods having heads or nuts 16 at their ends to furnish stops against the complete withdrawal of the rods from the guides.

In operation the box, mold, and intermediate bridging-plates are assembled, the veneers and clips inserted, the compartments of the mold filled, the box placed beneath the press, and the follower actuated to compress the fruit nearly or quite to its full extent. Preferably the compression is not completed at the first stroke, for the reason that otherwise it makes it too hard to withdraw the mold and there is danger then also of skinning the fruit which lies against the unprotected sides of the mold. So when the fruit has been partially compressed or before the fruit has been too compacted against the projections $a$ of the mold it is usual to lift the mold up into the follower, but not far enough, however, to engage the heads 16 on the rods 14 and disturb the bridge-band 9, and then to finish the compression. It is observed that the mold thus has a limited movement independent of the bridge member, which latter keeps any fruit from squeezing out over the edge of the box. With compression done the mold is fully drawn up to disengage it from the fruit, which is now even with the box. As the mold is finally lifted the guides 15 engage stops 16 and carry the telescoping bridge member upward with the mold. Also on the final descent of the follower the ends of the spring-clips 13 are caught over the ledges 4' of the follower, so that when the follower is retracted it takes the clips up with it. These clips remain in the follower until the mold and bridge member 9 are detached from the links 7, when they can easily be taken out by hand to be placed in position on the next box to be filled.

If desired, when first filling a box the prunes may be delivered in successive charges into the cells beneath the follower, the total number of charges aggregating the total contents of a finished cube, each charge being separated from the others by a horizontal wafer, as 17. Thus if a cell were to contain five pounds its contents could be compressed into a single brick weighing five pounds, or it could be subdivided into smaller bricks weighing one or more pounds each, aggregating five pounds. This enables the dealer to retail a box of fruit to his customers in any desired quantity and without marring the appearance of the box, as where all the prunes are dumped in loose.

One cube or a dozen cubes taken out of a box packed in the manner contemplated by me leaves the remaining contents undisturbed and as attractive as ever. Moreover, by this method the original packer is saved great expense in the matter of labor and handling and is enabled to place his goods before the public in attractive and marketable condition.

It is obvious that various changes may be made in the invention without departing from the principle herein expressed, and I do not wish to be understood as limiting myself to the specific construction described and shown.

Having thus described my invention, what

I claim, and desire to secure by Letters Patent, is—

1. An apparatus for packing prunes which comprises a cellular open-ended frame adapted to be inserted into a box or like container, a follower having vertical and transverse slots corresponding to the division-walls of the cells of said frame, means for reciprocating the follower to engage in the cells of said frame and means independent of the follower to retract said frame within the follower.

2. In an apparatus for packing dried fruits and the like, a mold comprising a frame portion to seat on the rim of the box, a series of vertically-arranged plates dividing the mold into a plurality of open-ended compartments said plates having portions extending below the mold and into the box, and a unitary follower having portions to enter each of said compartments.

3. In an apparatus for packing dried fruits and the like, a mold having a plurality of open-ended compartments and adapted to be inserted into a box, said mold provided with a portion extending above the box and operating as a containing-hopper, means for compacting the contents of said compartments within the box and means for withdrawing the mold from the compacted contents.

4. In an apparatus for packing dried fruits and the like, a mold having a plurality of open-ended compartments adapted to be inserted into a box, said mold having a surrounding frame portion above the rim of the box, means insertible between said surrounding portion of the mold and the box to prevent escape of material therebetween, and means for compressing the material in the compartments.

5. In an apparatus for packing dried fruits and the like, a mold having a plurality of open-ended compartments adapted to be inserted into a box, said mold having a surrounding frame portion above the rim of the box, means insertible between said surrounding portion of the mold and the box to prevent escape of material therebetween, and means for compressing the material in the compartments, said mold and said means inserted between the mold and box having a relative limited independent movement to permit the partial withdrawal of the mold without disturbing said interposed means.

6. In an apparatus for packing dried fruits and the like, the combination with an open-ended cellular mold adapted to be inserted into a box and having a portion extending above the box, of a band or ring inserted between the mold and the box, and having upper and lower projecting plates extending into the box and into the mold and arranged to bridge the space between the mold and box to prevent the escape of material therebetween, and means for compressing the material into the cells in said mold.

7. In an apparatus for packing dried fruits and the like, the combination with an open-ended cellular mold adapted to be inserted into a box and having a portion extending above the box, of a band or ring inserted between the mold and the box, and having upper and lower projecting plates extending into the box and into the mold and arranged to bridge the space between the mold and box to prevent the escape of material therebetween, means for compressing the material into the cells in said mold, and means for removing the mold from the material in the box during the compression period.

8. In an apparatus for packing dried fruits and the like, the combination with an open-ended cellular mold adapted to be inserted into a box and having a portion extending above the box, of a band or ring inserted between the mold and the box, and having upper and lower projecting plates extending into the box and into the mold and arranged to bridge the space between the mold and box to prevent the escape of material therebetween, means for compressing the material into the cells in said mold, means for removing the mold from the material in the box during the compression period and means operated by the mold to withdraw the ring.

9. In an apparatus for packing prunes, a cellular open-ended mold adapted to be inserted into a box and having a part extending thereabove, a band or ring extending between the mold and box and having downwardly and upwardly extending parts telescoping with the mold and box, a slotted plunger fitting the cells in the mold, and spring partition-holding clips carried by the walls of the cells of the mold.

10. In an apparatus for packing prunes, a cellular open-ended mold adapted to be inserted into a box and having a part extending thereabove, a band or ring extending between the mold and box and having downwardly and upwardly extending parts telescoping with the mold and box, a slotted plunger fitting the cells in the mold, spring partition-holding clips carried by the walls of the cells of the mold and means on the plunger for removing said clips on the retraction of the former.

11. In an apparatus for packing prunes, a cellular open-ended mold adapted to be inserted into a box and having a portion extending above the box, means interposed between the box and the mold, and telescoping with the box and mold to prevent the escape of material therebetween, said interposed means carried by the mold, means for compressing the contents of the cells of the mold, and means for withdrawing the mold during the compression period.

12. In an apparatus for packing prunes, the combination of a cellular open-ended mold adapted to be inserted into a box, clips fitting over the walls of the cells of the mold to hold veneer or like partition-strips in place and means for compressing material into the cells of the mold.

13. In an apparatus for packing prunes, the combination with a cellular open-ended mold adapted to be inserted into the box to be filled, of means for holding and protecting the upper edges of the partition-strips during the filling of the box.

In testimony whereof I have hereunto set my hand in presence of two subscribing witnesses.

SIVERT H. SHELLEY.

Witnesses:
    H. F. DUSING,
    J. C. BLACK.